(12) United States Patent
Ludlow

(10) Patent No.: US 11,813,222 B2
(45) Date of Patent: Nov. 14, 2023

(54) VIBRATORY COUGH SUPPRESSION

(71) Applicant: James Madison Innovations, Inc., Harrisonburg, VA (US)

(72) Inventor: Christy Leslie Ludlow, Washington, VA (US)

(73) Assignee: James Madison Innovations, Inc., Harrisonburg, VA (US)

( * ) Notice: Subject to any disclaimer, the term of this patent is extended or adjusted under 35 U.S.C. 154(b) by 135 days.

(21) Appl. No.: 17/464,406

(22) Filed: Sep. 1, 2021

(65) Prior Publication Data
US 2021/0393477 A1 Dec. 23, 2021

Related U.S. Application Data

(63) Continuation of application No. 15/204,825, filed on Jul. 7, 2016, now abandoned.

(60) Provisional application No. 62/190,157, filed on Jul. 8, 2015.

(51) Int. Cl.
*A61H 23/00* (2006.01)
*A61H 23/02* (2006.01)
*G09B 19/04* (2006.01)
*H04W 4/80* (2018.01)

(52) U.S. Cl.
CPC ........... *A61H 23/008* (2013.01); *A61H 23/02* (2013.01); *G09B 19/04* (2013.01); *H04W 4/80* (2018.02); *A61H 23/0236* (2013.01); *A61H 23/0245* (2013.01); *A61H 23/0254* (2013.01); *A61H 2201/5012* (2013.01); *A61H 2201/5015* (2013.01); *A61H 2201/5058* (2013.01); *A61H 2201/5071* (2013.01); *A61H 2201/5076* (2013.01); *A61H 2205/04* (2013.01); *A61H 2230/405* (2013.01)

(58) Field of Classification Search
CPC ..................................................... A61H 23/008
See application file for complete search history.

(56) References Cited

U.S. PATENT DOCUMENTS

| | | | | |
|---|---|---|---|---|
| 2008/0051839 | A1* | 2/2008 | Libbus | A61B 5/4047 607/2 |
| 2011/0046432 | A1* | 2/2011 | Simon | A61N 5/0625 607/42 |
| 2016/0095549 | A1* | 4/2016 | Chang | A61B 7/003 600/534 |
| 2016/0375265 | A1* | 12/2016 | Kim | A61N 5/0613 607/89 |

* cited by examiner

*Primary Examiner* — LaToya M Louis
(74) *Attorney, Agent, or Firm* — LEVEQUE INTELLECTUAL PROPERTY LAW, P.C.

(57) ABSTRACT

An apparatus includes a vibrational transducer, a placement band, a driver module and a control module. The placement band is configured to hold the vibrational transducer adjacent to the skin surface overlying the cricoid cartilage and trachea region of a patient's neck. The driver module is configured to apply a drive signal to the vibrational transducer. The control module is configured to receive at least one input configured to provide vibrational operating information and control the driver module to cause the vibrational transducer to apply a vibratory stimulation in an amount determined, at least in part, by the vibrational operating information.

17 Claims, 7 Drawing Sheets dispose a vibrational transducer on the skin surface overlying the cricoid cartilage and trachea region of a patients neck
610 cause the vibrational transducer to apply a vibratory stimulation in an amount determined, at least in part, by an externally provided vibrational operating information
620

Detect, via a persistent cough detection module, the presence of a persistent cough
630

FIG. 6

VIBRATORY COUGH SUPPRESSION

CROSS-REFERENCE TO RELATED APPLICATIONS

This application is a continuation of U.S. patent application Ser. No. 15/204,825 (filed on Jul. 7, 2016) which claims the benefit of U.S. Provisional Patent Application No. 62/190,157 (filed on Jul. 7, 2015), the disclosures of which are incorporated herein by reference in their entireties.

BACKGROUND OF THE INVENTION

Chronic cough is a disorder of uncontrolled coughing that may persist for 8 weeks or more. This disorder may adversely affect the quality of life of 5-33% of the population. Currently medications such as dextromethorphan or opiates are used to treat chronic cough but because of sedation and addiction side effects these are limited in dosage and duration of usage. Otherwise, the patient may try to consciously suppress their coughing which is difficult to do. These patients are annoying to others and also have sleeping difficulties because of coughing waking them up at night. What is needed is a non-invasive device to suppress a chronic cough.

BRIEF DESCRIPTION OF THE SEVERAL VIEWS OF THE DRAWINGS

Example

Example

Example

Example

Example

Example FIG. 6 is a flow diagram of a method of suppressing a persistent cough according to aspects of some of the various embodiments.

Example

DETAILED DESCRIPTION OF EMBODIMENTS

Embodiments of the present invention may be employed as a treatment for chronic cough. Chronic cough is a disorder of uncontrolled coughing that may persist for 8 weeks or more. This disorder may adversely affect the quality of life of 5-33% of the population. When no contributing underlying disorder has been identified the disorder may be considered a hypersensitivity to sensory triggers resulting in uncontrolled cough. Worldwide studies of patients have demonstrated that such patients often are female and have heightened cough reflex sensitivity. Such patients may have a central nervous system hyper-reactivity of the cough system at multiple levels; including the cough reflex in the brain stem, and at the cortical levels involving sensing the urge to cough and cortical modulation of cough generation. Treatment usually involves pharmacology and may be only partially effective and limited due to significant dose-limiting side effects such as sedation, and addiction.

Figure 1:
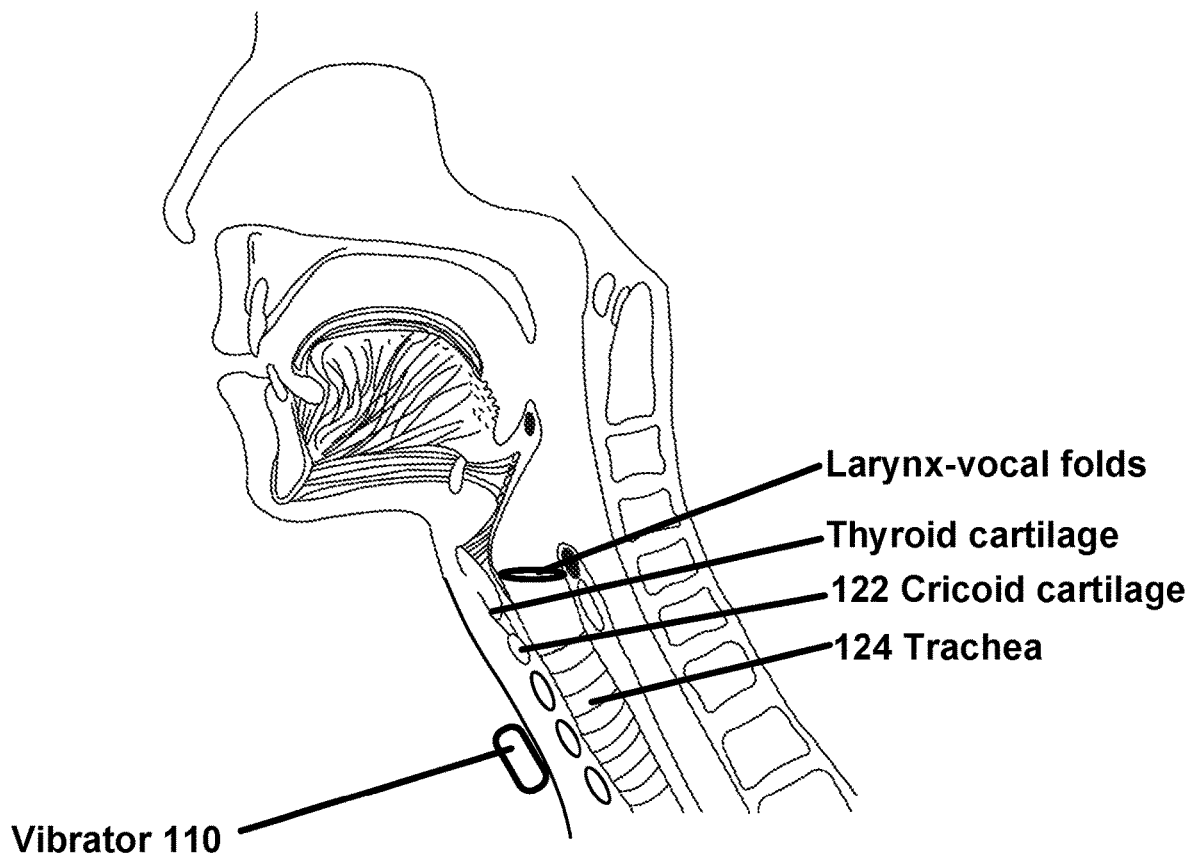
FIG. 1 is an illustration of the placement of a vibrator according to aspects of some of the various embodiments.

Some of the various embodiments comprise a noninvasive device that a patient may employ to suppress cough. Embodiments produce vibration of the trachea and subglottal region to interfere and reduce sensitivity of receptors in that area. Example FIG. 1 is an illustration of the placement of a vibrator 110 according to aspects of some of the various embodiments. As illustrated, the vibrator 110 may be placed on the skin surface overlying the cricoid cartilage and trachea.

Figure 2:
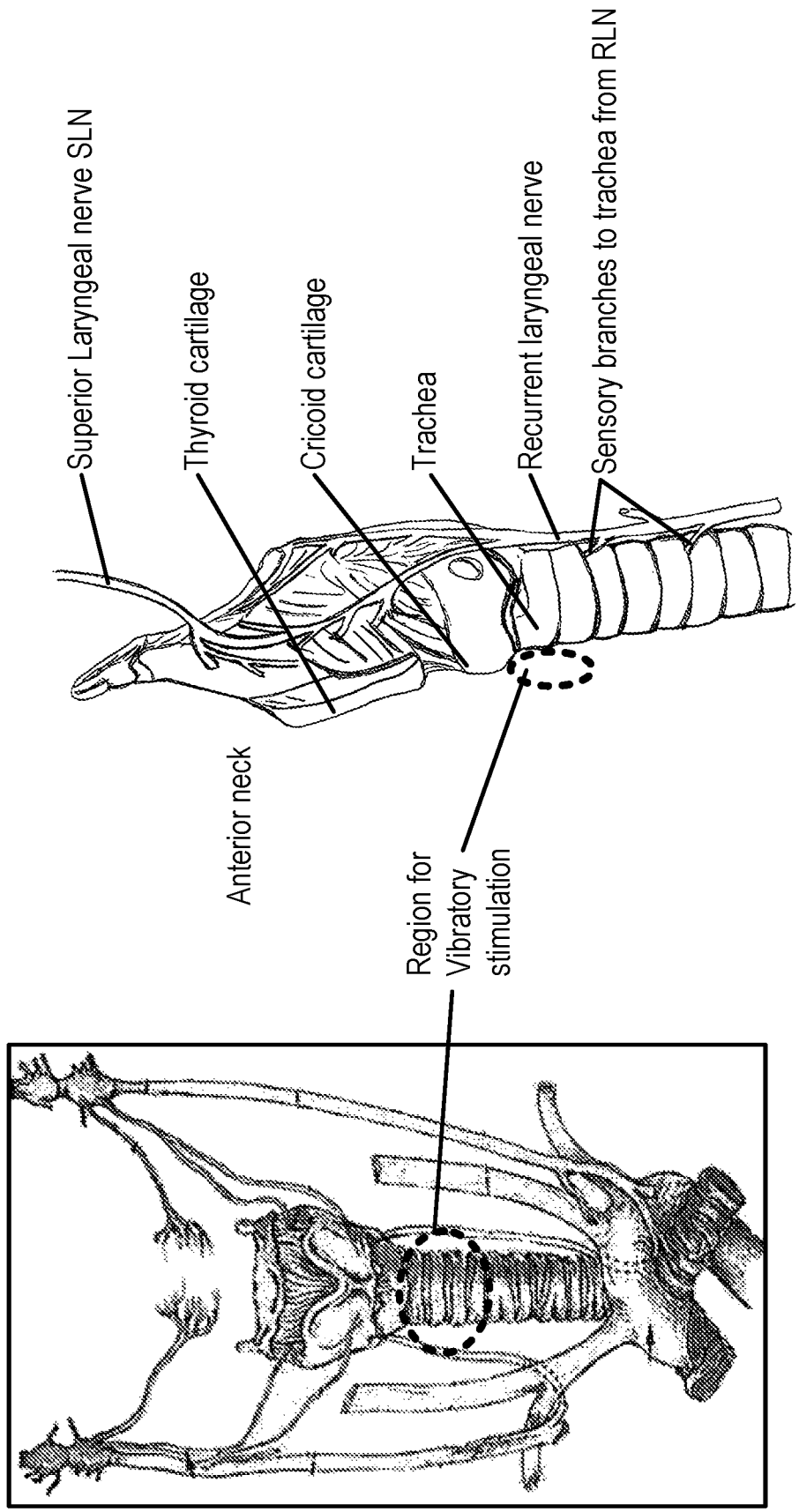
FIG. 2 is illustration showing the location of sensory fibers contained in the recurrent laryngeal nerve which innervate the subglottic and trachea regions.

A patient activated or automatic vibrator 110 may be placed on the neck overlying the cricoid cartilage 122 and trachea 124 to provide vibratory stimulation configured to penetrate deep into the trachea and subglottal region to interfere with sensory endings of the recurrent laryngeal nerve which can trigger a cough. The cell bodies for the afferents contained in the recurrent laryngeal nerve that contribute to cough are contained in the nodose and jugular ganglia and terminate in the nucleus tractus solitarius (NTS) in the brain stem. The NTS may be activated by the sensory endings that have input to the cough generators in the medulla. A cough may be elicited by stimulation of the sensory endings in the recurrent laryngeal nerve. By presenting a vibratory stimulus to these sensory endings, the sensory endings may be activated by the vibratory stimulus. The stimulation may interfere with activation of these sensory endings by other stimulation such as irritants in the subglottal region and the trachea which trigger the cough. Little evidence has been found that a vibratory stimulus in the tracheal and subglottal region can invoke a cough in awake humans. In fact, this stimulation may invoke swallowing which has been shown to suppress laryngeal reflexes such as a cough. Tracheal receptors responsible for inducing a cough include Aδ mechanoreceptors which are usually hypersensitive in chronic cough. These mechanoreceptors, which may be sensitive to vibration, are located in the trachea and are innervated by the recurrent laryngeal nerve (See FIG. 2 showing the location of sensory fibers contained in the recurrent laryngeal nerve which innervate the subglottic and trachea regions).

According to some of the various embodiments, a vibration may be applied to the trachea region of a patient to desensitize the patient and reduce the elicitation of chronic cough. This is in contrast to alternative proposals of using air puff stimulation to the pharyngeal area as a desensitization method to suppress cough. An air puff device for stimulation the pharynx requires the insertion of a tube into the posterior oral pharyngeal cavity which is invasive and would require medical supervision. Further the upper airway mucosa rapidly adapts to air pressure stimulation and the effects may be short-lived in contrast with a vibratory stimulus which continuously oscillates between multiple directions (e.g. two) and to which neural responses do not adapt. Additionally, an airpuff stimulus in the intra-oral area may have an excitatory effect on blood flow in the cortical somatosensory regions in awake humans. As cortical activity in the somatosensory areas was previously shown to be active during volitional cough and has been posited as an area of hyperactivity in patients with chronic cough, it was important to determine the effect of air puff and vibration on cortical activity in awake humans.

Figure 3:
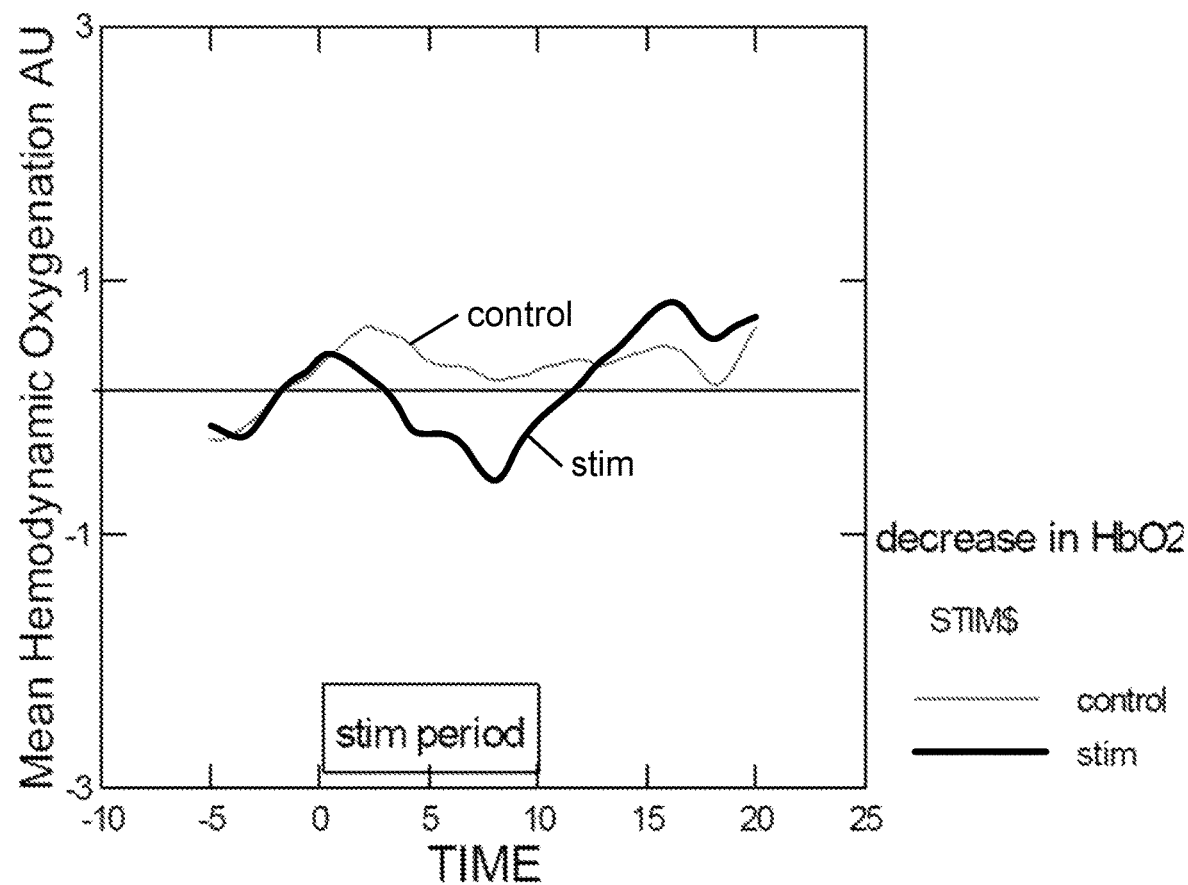
FIG. 3 is a graph of experimental results showing reduction in blood oxygenation level in the Cortical left post central somatosensory region with vibratory stimulation on the neck.

Example FIG. 3 is a graph of experimental results showing changes in blood oxygenation in the Cortical left post central somatosensory region with vibratory stimulation on the neck. Vibratory stimulation may have a suppressive effect on cortical activity in the somatosensory areas. Near infra-red spectroscopy was employed to examine changes in oxygenation of hemoglobin in the somatosensory cortices as illustrated in the graph of FIG. 3. As shown, the levels of oxygenated hemoglobin were reduced by vibrotactile stimulation in the throat area with a pancake motor. Thus the vibratory stimulation produced suppression of the post central somatosensory regions of the cortex, the region thought to be hyperactive in chronic cough.

This demonstrates that vibratory stimulation not only blocks and disrupts sensory receptors in the trachea and subglottic area, but also has a suppressive effect on cortical activity in an area thought to be overly activate in chronic cough. Therefore, some of the various embodiments of the present invention may be employed to present a non-invasive vibratory stimulation to the upper airway using a vibrator (e.g. small motor, piezo-electric crystal, shaker, combinations thereof, and/or the like) placed on the skin overlying the cricoid cartilage and trachea to suppress cough receptors and reduce cortical activity in somatosensory areas of the brain.

Various embodiments may desensitize patients to tracheal stimulation while reducing cortical activity involved in the somatosensory regions affected in chronic cough. Thus, various embodiments may disrupt hyperactivity in both the reflexive pathway as well as suppression in the urge to cough centers in the cortex.

Various embodiments comprising a noninvasive vibratory device placed on the skin over the trachea and cricoid cartilage to deliver vibration to mechanoreceptors in the trachea, may be employed by patients in their everyday environment without adverse effects. By vibrating the tissues in the trachea and subglottis, the patient may become less responsive to sensory triggers for cough. With daily use of some of the various embodiments over time, cough hyper-excitability may become reduced in both brain stem mechanisms as well as cortical somatosensory regions due to neuroplastic changes possible in the central nervous system pathways. Some of the various embodiments may be non-invasive and may be employed by patients in various settings without medical supervision. The patient may activate vibration either by pressing a switch to suppress cough when they feel the urge to cough or set the device in one or more automatic modes. One example automatic mode may automatically cycle on and off for selected periods to disrupt chronic cough throughout the day. Other automatic modes may employ a modulation pattern of frequencies, amplitudes and times. Yet other automatic modes may employ a cough detection circuitry to engage vibrations in response to detected coughs.

Some of the various embodiments may allow a patient with a chronic cough to control the cough. The embodiments may comprise a vibratory stimulator that interferes with the sensory triggers leading to a cough. The vibration may block the effects with irritation of afferents in the subglottic and tracheal areas. Simultaneously, this stimulation may suppress cortical activity in somatosensory areas in the cortex which has recently been shown to have hyper-excitability in chronic cough patients. In this way, some of the various embodiments may help the patient control their chronic coughing either when coughing occurs or by having the device turned on it will prevent the coughing from occurring. Currently, these patients may have multiple physician visits and be prescribed medications of limited benefit. More recently, speech pathologists have provided behavioral methods of teaching a patient ways to control their coughing. Some of the various embodiments may be configured to help these patients and reduce the cost of multiple physician or therapist visits.

Figure 4:
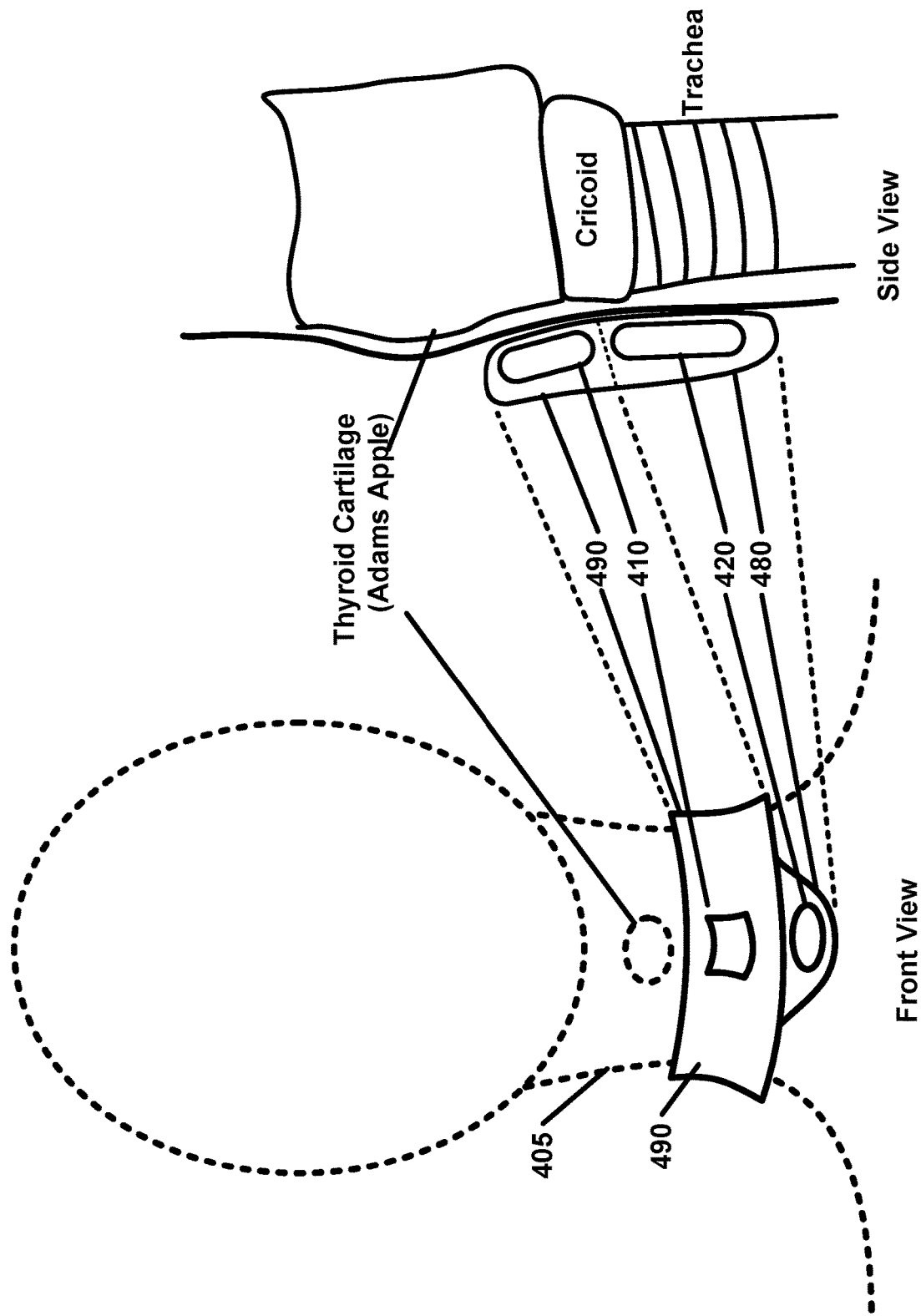
FIG. 4 is diagram of a cough suppression apparatus being worn by a patient according to aspects of some of the various embodiments.
Figure 5:
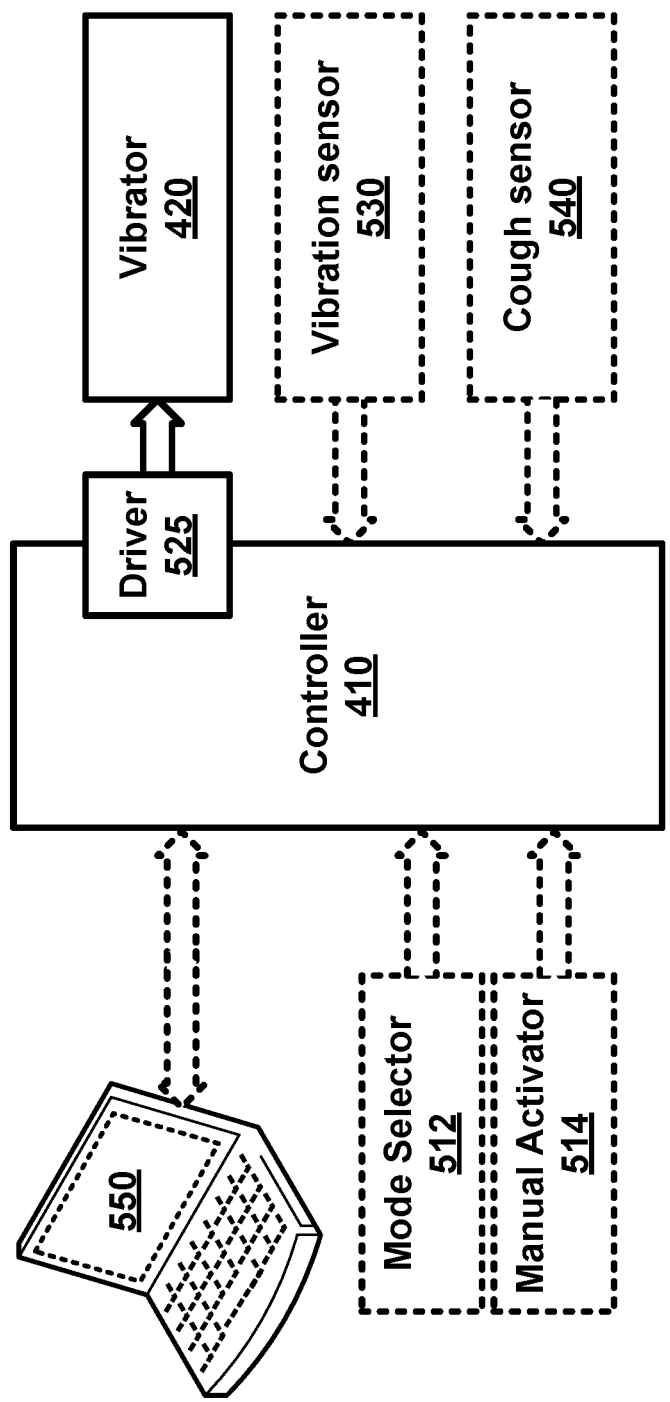
FIG. 5 is diagram of a cough suppression apparatus according to aspects of some of the various embodiments.

Example FIG. 4 is diagram of a cough suppression apparatus being worn by a patient 405 according to aspects of some of the various embodiments. Example FIG. 5 is diagram of a cough suppression apparatus according to aspects of some of the various embodiments. As illustrated in FIG. 4 a placement plate 480 attached to a band 490 may be worn by a patient 405 who may have a persistent cough. The placement plate 480 may hold a vibrational transducer 420 and a controller 410. The placement band 490 may be configured to hold the vibrational transducer 420 adjacent to the skin surface overlying the cricoid cartilage and trachea region of the patient's neck. As illustrated in FIG. 5, a driver module 525 may be configured to apply a drive signal to the vibrational transducer 420 under control of the controller 410. The controller 410 may be configured to receive at least one input configured to provide vibrational operating information and control the driver module to cause the vibrational transducer 420 to apply a vibratory stimulation in an amount determined, at least in part, by the vibrational operating information.

According to various embodiments, the vibration amount may be static and/or dynamic. For example, when the amount is static, the vibratory stimulation may be at a constant amplitude and frequency. In contrast, when the amount is dynamic, the vibratory stimulation may be modulated. Modulation may vary the amplitude and/or the frequency of the vibratory stimulation. Modulation as discussed herein may also comprise temporal sequences of vibrations for specific periods of time at various frequencies and/or amplitudes.

According to various embodiments, the controller 410 may be configured to receive various types of vibrational operating information. Vibrational information is information that the controller may employ to determine how to engage the vibrational transducer 420. The vibrational operating information may comprise at least one of the following: on/off information, vibration modulation information, temporal vibration information, amplitude vibration information, a combination thereof, and/or the like. For example, in a simple form, the vibrational operating information may comprise the output of a manually operated on/off switch to determine whether the vibrational transducer 420 should be engaged or not. In a more complex example, the vibrational operating information may comprise vibration and/or effectiveness feedback information. Vibration feedback information could, for example be generated by vibration sensor 530. Effectiveness feedback information could, for example, be generated by cough sensor 540. The feedback information may be employed by controller 410 to employ a feedback loop to ensure that a measured vibration is applied to a patient 405.

According to some of the various embodiments, the vibrational transducer 420 may comprise at least one of the following: a piezo-electric crystal, a motor, a speaker, a shaker, a combination of the above, and/or the like. The vibrational transducer 420 may be configured to produce a vibration between 40 and 120 Hz.

According to some of the various embodiments, at least one of the following may be connected to an input on the controller 410: a mode selector 512, a manual activator 514, a vibration sensor 530, a cough sensor 540, a computing device 550, combinations thereof, and/or the like. The manual activator 514 may comprise a switch, a smart activation device, a combination thereof, and/or the like. The manual activator 514 may be employed to activate the device. So for example, if a patient 405 starts coughing, the patient 405 may manually press the manual activator 514 to start the device.

The mode selector 512 may comprise a multi-position switch, a selection device (e.g. a smart controller, a mobile device connected via a communications interface, a combination thereof, and/or the like). Selected modes may comprise various operational modes, such as, for example, a manual mode, a timed mode, a sequenced mode, an adaptive mode, combinations thereof, and/or the like.

The computing device 550 may comprise a device such as, for example, a computer, a tablet, a smart phone, a monitoring device, combinations thereof, and/or the like. The computing device 550 may be configured to operate as an interface to program or otherwise provide operational inputs to controller 410. The computing device 550 may communicate to controller 410 via a communication link. By way of example, and not limitation, a communication link may comprise a wired communications link and/or a wireless communications link. Examples of wired communications link include Ethernet, fiber optic, General Purpose Instrument Bus (GPIB), RS-232, RS-422, RS-485, Serial peripheral interface (SPI), an inter-integrated circuit interface (I2C), FireWire™, a Universal Serial Bus (USB), and/or the like. Examples of wireless links may employ, for example, radio frequency links, radios, Bluetooth™, cellular, Wi-Fi, combinations thereof, and/or the like. The communications link may comprise various combinations of wired and/or wireless communications links (e.g. a communications network).

The vibration sensor 530 may comprise a device configured to sense vibration, such as, for example, a microphone, a piezoelectric sensor, an accelerometer, an optical motion sensor, combinations thereof, and/or the like. A piezoelectric sensor is a device that uses the piezoelectric effect, to measure changes in pressure, sound, acceleration, temperature, strain, or force by converting them to an electrical charge. A microphone is a vibration-to-electric transducer or sensor that converts vibrations (e.g. sound) sound into an electrical signal. An accelerometer is a device which converts mechanical motion into an electrical signal. The vibration sensor 530 may process the raw signals into a value useable to controller 410. For example, vibration sensor 530 may digitize a raw electrical signal from a piezo-electric crystal and communicate the digitized value to the controller 410. In yet another example, vibration sensor 530 may convert a raw electrical signal from a piezo-electric crystal into a readable range (e.g. zero to 5 volts) readable by controller 410.

According to some of the various embodiments, the apparatus may further comprise a cough sensor 540 configured to detect the presence of a persistent cough(s). The cough sensor 540 may comprise a cough detection module. The cough detection module may employ at least one of an audio sensor and a vibration sensor, a combination thereof, and/or the like to detect cough sounds and/or vibrations. The detected signals may be processed by a signal processor to statistically match detected signals to a cough. A sequence of coughs over a prolonged period of time (e.g. an hour) may be categorized as a persistent cough. Examples of cough detection devices are disclosed, for example, in U.S. Pat. No. 8,241,223 titled "Cough Detector" to Gavriely et al. The output of the cough detection module may comprise cough detection information.

Example FIG. 6 is a flow diagram of a method of suppressing a persistent cough according to aspects of some of the various embodiments. At 610, a vibrational transducer may be disposed on the skin surface overlying the cricoid cartilage and trachea region of a patient's neck. A vibratory stimulation may be applied employing the vibrational transducer in an amount determined, at least in part, by an externally provided vibrational operating information at 620.

According to some of the various embodiments, a persistent cough detection module may be employed to detect the presence of a persistent cough at 630. A persistent cough may be detected, for example, by employing a device such as, but not limited to: an audio sensor, a vibration sensor, a signal processor, combinations thereof, and/or the like. The vibrational operating information may comprise cough detection information.

The vibrational transducer may be driven to produce a vibration between 40 and 120 Hz. Other frequencies and/or combinations of frequencies may also be employed. For example, the vibrational transducer may be driven to produce a modulated vibration at 4 Hz for short periods of 150 ms interrupted by periods of 100 ms of no vibration. According to some of the various embodiments, the modulated vibration may be amplitude and/or frequency modulated.

The vibrational operating information may comprise various information regarding the actual, desired and/or effectiveness of performance of the vibrational transducer. For example, the vibrational operating information may comprise at least one of the following: on/off information, vibration modulation information, temporal vibration information, amplitude vibration information, combinations thereof and/or the like. According to some of the various embodiments, the vibrational operating information may be employed as feedback information to allow the modification of the vibrations to increase cough suppression efficacy.

Figure 7:
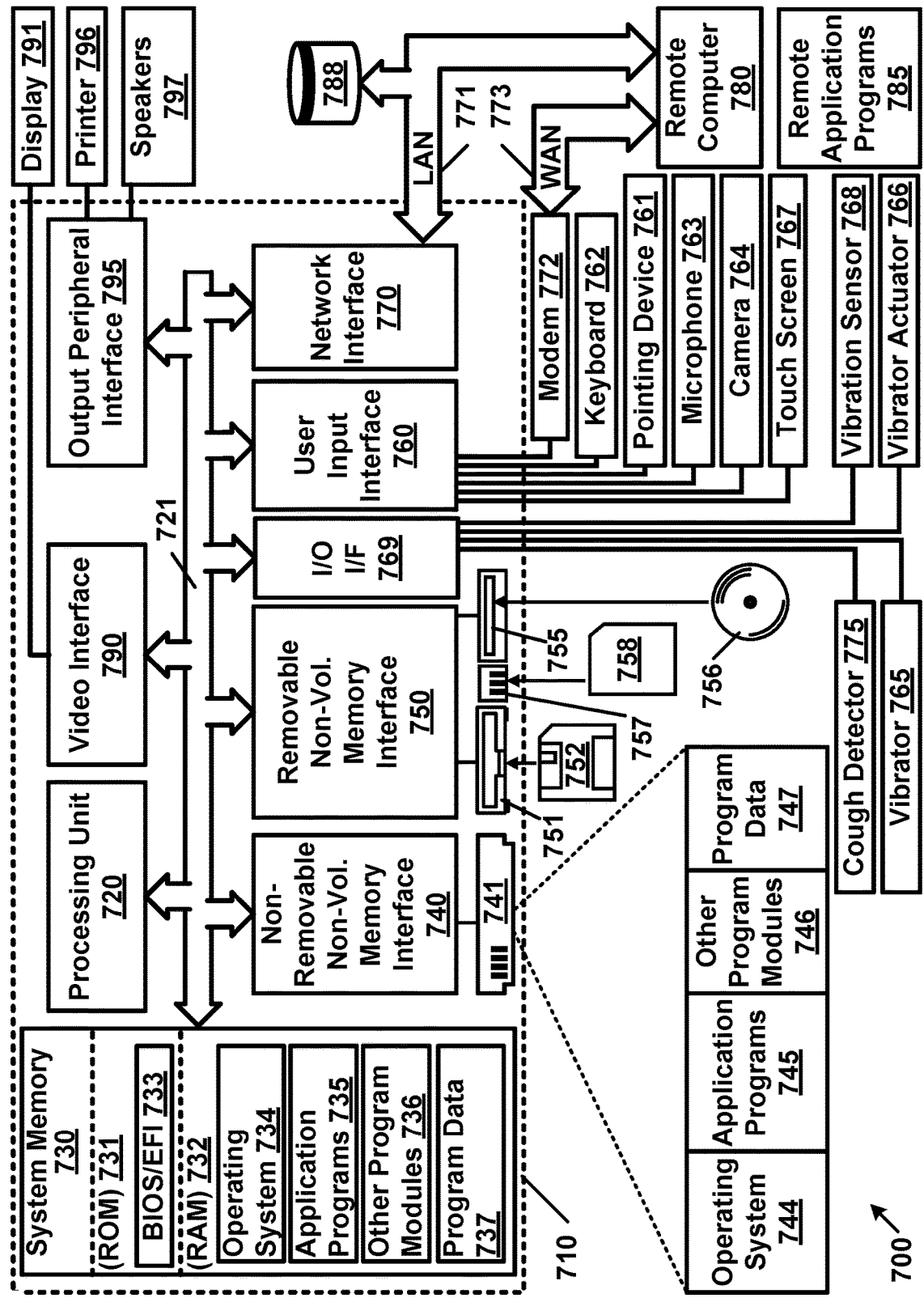
FIG. 7 illustrates an example controller and/or computing environment on which aspects of some embodiments may be implemented.

Example FIG. 7 illustrates an example controller and/or computing environment on which aspects of some embodiments may be implemented. The computing environment 700 is only one example of a computing environment and is not intended to suggest any limitation as to the scope of use or functionality of the claimed subject matter. Neither should the computing environment 700 be interpreted as having any dependency or requirement relating to any one or combination of components illustrated in the example operating environment 700.

Embodiments are operational with numerous other general purpose or special purpose computing system environments or configurations. Examples of well-known computing systems, environments, and/or configurations that may be suitable for use with various embodiments include, but are not limited to, embedded computing systems, personal computers, server computers, mobile devices, hand-held or laptop devices, multiprocessor systems, microprocessor-based systems, set top boxes, programmable consumer electronics, medical device, network PCs, minicomputers, mainframe computers, cloud services, telephonic systems, distributed computing environments that include any of the above systems or devices, and the like. So, for example, controller 410 may be an embedded system mounted in proximity to band 490 while computing device 550 may be a laptop and/or other type of mobile computing device.

Embodiments may be described in the general context of computer-executable instructions, such as program modules, being executed by computing capable devices. Generally, program modules include routines, programs, objects, components, data structures, etc. that perform particular tasks or implement particular abstract data types. Some embodiments may be designed to be practiced in distributed computing environments where tasks are performed by remote processing devices that are linked through a communications network. In a distributed computing environment, program modules may be located in both local and remote computer storage media including memory storage devices.

With reference to FIG. 7, an example system for implementing some embodiments includes a computing device 710. Components of computing device 710 may include, but are not limited to, a processing unit 720, a system memory 730, and a system bus 721 that couples various system components including the system memory 730 to the processing unit 720.

Computing device 710 may comprise a variety of computer readable media. Computer readable media may be any available media that can be accessed by computing device 710 and includes both volatile and nonvolatile media, and removable and non-removable media. By way of example, and not limitation, computer readable media may comprise computer storage media and communication media. Computer storage media may comprise volatile and/or nonvolatile, and/or removable and/or non-removable media implemented in any method or technology for storage of information such as computer readable instructions, data structures, program modules or other data. Computer storage media comprises, but is not limited to, random access memory (RAM), read-only memory (ROM), electrically erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by computing device 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media configured to communicate modulated data signal(s). Combinations of any of the above should also be included within the scope of computer readable media.

The system may allow local or remote enquiry by a practitioner or their assistant on many parameters in the system including but not limited to periods of device usage over time (days, weeks), frequency of coughs, and changes in frequency of coughs with device use. The practitioner or their assistant could be able to monitor patient progress and program settings to match patient needs over time.

System memory 730 includes computer storage media in the form of volatile and/or nonvolatile memory such as ROM 731 and RAM 732. A basic input/output system 733 (BIOS), containing the basic routines that help to transfer information between elements within computing device 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737 that may be stored in RAM 732.

Computing device 710 may also include other removable/non-removable volatile/nonvolatile computer storage media. By way of example only, FIG. 7 illustrates a hard disk drive 741 that may read from or writes to non-removable, non-volatile magnetic media, a magnetic disk drive 751 that may read from or write to a removable, nonvolatile magnetic disk 752, a flash drive reader 757 that may read flash drive 758, and an optical disk drive 755 that may read from or writes to a removable, nonvolatile optical disk 756 such as a Compact Disc Read Only Memory (CD ROM), Digital Versatile Disc (DVD), Blue-ray Disc™ (BD) or other optical media. Other removable/non-removable, volatile/nonvolatile computer storage media that may be used in the example operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7 provide storage of computer readable instructions, data structures, program modules and other data for computing device 710. In FIG. 7, for example, hard disk drive 741 is illustrated as storing operating system 744, application programs 745, program data 747, and other program modules 746. Additionally, for example, non-volatile memory may include instructions, for example, to discover and configure IT device(s), to create device neutral user interface command(s), combinations thereof, and/or the like.

A user may enter commands and information into computing device 710 through input devices such as a keyboard 762, a microphone 763, a camera 764, touch screen 767, and a pointing device 761, such as a mouse, trackball or touch pad. These and other input devices are often connected to the processing unit 720 through a user input interface 760 that is coupled to the system bus 721, but may be connected by other interface and bus structures, such as a parallel port, a game port and/or a universal serial bus (USB).

Sensors and actuators, such as cough detector 775, vibrator 765, vibration sensor 768 and vibration actuator 766 may be connected to the system bus 721 via an Input/Output Interface (I/O I/F) 769. Examples of vibration sensor(s) 768 comprise an accelerometer, a piezoelectric crystal, and/or the like. A display monitor 791 or other type of display device may also be connected to the system bus 721 via an interface, such as a video interface 790. Other devices, such as, for example, speakers 797 and printer 796 may be connected to the system via peripheral interface 795.

Computing device 710 may be operated in a networked environment using logical connections to one or more remote computers, such as a remote computer 780. The remote computer 780 may be a personal computer, a mobile device, a hand-held device, a server, a router, a network PC, a medical device, a peer device or other common network node, and typically includes many or all of the elements described above relative to computing device 710. The logical connections depicted in FIG. 7 include a local area network (LAN) 771 and a wide area network (WAN) 773, but may also include other networks such as, for example, a cellular network. Such networking environments are commonplace in offices, enterprise-wide computer networks, intranets and the Internet.

When used in a LAN networking environment, computing device 710 may be connected to the LAN 771 through a network interface or adapter 770. When used in a WAN networking environment, computing device 710 typically includes a modem 772 or other means for establishing communications over the WAN 773, such as the Internet. The modem 772, which may be internal or external, may be connected to the system bus 721 via the user input interface 760, or other appropriate mechanism. The modem 772 may be wired or wireless. Examples of wireless devices may comprise, but are limited to: Wi-Fi, Near-field Communication (NFC) and Bluetooth™. In a networked environment, program modules depicted relative to computing device 710, or portions thereof, may be stored in the remote memory storage device 788. By way of example, and not limitation, FIG. 7 illustrates remote application programs 785 as residing on remote computer 780. It will be appreciated that the network connections shown are exemplary and other means of establishing a communications link between the computers may be used. Additionally, for example, LAN 771 and WAN 773 may provide a network interface to communicate with other distributed infrastructure management device(s); with IT device(s); with users remotely accessing the User Input Interface 760; combinations thereof, and/or the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In this specification, "a" and "an" and similar phrases are to be interpreted as "at least one" and "one or more." References to "an" embodiment in this disclosure are not necessarily to the same embodiment.

Some of the elements described in the disclosed embodiments may be implemented as modules. A module is defined here as an isolatable element that performs a defined function and has a defined interface to other elements. The modules described in this disclosure may be implemented in hardware, a combination of hardware and software, firmware, wetware (i.e hardware with a biological element) or a combination thereof, all of which are behaviorally equivalent. For example, modules may be implemented using computer hardware in combination with software routine(s) written in a computer language (such as C, C++, Fortran, Java, Basic, Matlab™ or the like) or a modeling/simulation program such as Simulink™, Stateflow™, GNU Octave™, or LabVIEW MathScript™. Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies may be used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) persistent cough suppression. However, one skilled in the art will recognize that embodiments of the invention could be employed to suppress periodic cough episodes.

In addition, it should be understood that any figures that highlight any functionality and/or advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. An apparatus for suppressing a chronic cough of a patient, comprising:
   a cough sensor including a cough detection module configured to:
      detect a chronic cough of a patient, and
      output cough detection information;
   a non-invasive vibration transducer configured to:
      receive a drive signal, and
      apply a vibration to an external skin surface overlying the cricoid cartilage and trachea area of the patient which vibrates tissues in the trachea and subglottic region to interfere with sensory endings of the recurrent laryngeal nerve to desensitize the patient and reduce elicitation of the chronic cough, the vibration having a frequency equal to or less than 120 Hz;
   a driver module, coupled to the vibration transducer, configured to:
      generate the drive signal based on a control signal, and
      apply the drive signal to the vibration transducer; and
   a controller, coupled to the driver module and the cough sensor, configured to:
      when operating in an automatic mode:
         receive the cough detection information from the cough detection module,
         generate the control signal based at least in part on the cough detection information, and send the control signal to the driver module;
a mode selector, coupled to the controller, configured to send a mode signal to the controller in response to a patient action, where the mode selector is a multi-position switch and where the controller is further configured to:
receive the mode signal from the mode selector,
generate the control signal based at least in part on the mode signal, and send the control signal to the driver module;
a manual activator, coupled to the controller, configured to send an activation signal to the controller in response to a patient action, where the manual activator is a switch and where the controller is further configured to:
receive the activation signal from the manual activator,
generate the control signal based on the activation signal, and
send the control signal to the driver module.

2. The apparatus of claim 1, where the vibration has a constant amplitude and a constant frequency between 40 Hz and 120 Hz.

3. The apparatus of claim 1, where the vibration has at least one of a varying amplitude and a varying frequency between 40 Hz and 120 Hz.

4. The apparatus of claim 1, where the vibration includes a temporal sequence of vibrations having a period of 250 ms including a modulated vibration at 4 Hz for 150 ms, and no vibration for 100 ms.

5. The apparatus of claim 1, where the cough detection module includes at least one of a vibration sensor and an audio sensor.

6. The apparatus of claim 1, further comprising:
a vibration sensor, coupled to the controller, configured to generate vibration feedback information,
where the controller is further configured to:
receive the vibration feedback information from the vibration sensor,
generate the control signal based on the vibration feedback information, and
send the control signal to the driver module.

7. The apparatus of claim 1, further comprising:
a placement band configured to hold a placement plate adjacent to the external skin surface overlying the cricoid cartilage and trachea region of the patient, the placement plate configured to support at least the controller, the driver module and the vibration transducer.

8. A method for suppressing a chronic cough of a patient using a cough suppression apparatus, comprising:
at a cough sensor including a cough detection module:
detecting a chronic cough of a patient, and
outputting cough detection information;
at a non-invasive vibration transducer:
receiving a drive signal, and
applying a vibration to an external skin surface overlying the cricoid cartilage and trachea region of the patient which vibrates tissues in the trachea and subglottic region to interfere with sensory endings of the recurrent laryngeal nerve to desensitize the patient and reduce elicitation of the chronic cough, the vibration having a frequency equal to or less than 120 Hz;
at a driver module:
generating the drive signal based on a control signal, and
applying the drive signal to the vibration transducer; and
at a controller:
when operating in an automatic mode:
receiving the cough detection information from the cough detection module,
generating the control signal based at least in part on the cough detection information, and
sending the control signal to the driver module.

9. The method of claim 8, further comprising:
at the controller:
receiving a mode signal from a mode selector in response to a patient action,
generating the control signal based at least in part on the mode signal, and
sending the control signal to the driver module.

10. The method of claim 9, further comprising:
at the controller:
receiving an activation signal from a manual activator in response to a different patient action,
generating the control signal based on the activation signal, and
sending the control signal to the driver module.

11. The method of claim 10, where the mode selector is a multi-position switch and the manual activator is a switch.

12. The method of claim 8, where the vibration has a constant amplitude and a constant frequency between 40 Hz and 120 Hz.

13. The method of claim 8, where the vibration has at least one of a varying amplitude and a varying frequency between 40 Hz and 120 Hz.

14. The method of claim 8, where the vibration includes a temporal sequence of vibrations having a period of 250 ms including a modulated vibration at 4 Hz for 150 ms, and no vibration for 100 ms.

15. The method of claim 8, where the cough detection module includes at least one of a vibration sensor and an audio sensor.

16. The method of claim 8, further comprising:
at the controller:
receiving vibration feedback information from a vibration sensor,
generating the control signal based on the vibration feedback information, and
sending the control signal to the driver module.

17. The method of claim 8, further comprising:
holding, using a placement band, a placement plate adjacent to the external skin surface overlying the cricoid cartilage and trachea region of the patient, the placement plate supporting at least the controller, the driver module and the vibration transducer.

* * * * *